United States Patent
Chi

(10) Patent No.: US 6,976,130 B2
(45) Date of Patent: Dec. 13, 2005

(54) CACHE CONTROLLER UNIT ARCHITECTURE AND APPLIED METHOD

(75) Inventor: Hua-Chang Chi, Taoyuan (TW)

(73) Assignee: Faraday Technology Corp., Hsinchu (TW)

( * ) Notice: Subject to any disclaimer, the term of this patent is extended or adjusted under 35 U.S.C. 154(b) by 372 days.

(21) Appl. No.: 10/355,171

(22) Filed: Jan. 31, 2003

(65) Prior Publication Data

US 2004/0153610 A1 Aug. 5, 2004

(51) Int. Cl.[7] .............................................. G06F 12/00
(52) U.S. Cl. ...................................... 711/143; 711/144
(58) Field of Search .................................. 711/143–144

(56) References Cited

U.S. PATENT DOCUMENTS

| | | | | |
|---|---|---|---|---|
| 5,247,643 A | * | 9/1993 | Shottan ....................... 711/143 |
| 5,404,483 A | * | 4/1995 | Stamm et al. ............... 711/144 |
| 6,065,099 A | * | 5/2000 | Clark et al. .................. 711/133 |

* cited by examiner

Primary Examiner—Matthew D. Anderson

(57) ABSTRACT

A cache controller unit (CCU) architecture with dirty line write-back auto-adjustment, suitable for high performance microprocessor systems with write-back cache memory. The CCU architecture includes a cache data control unit to access data between a cache memory and a CPU, a tag compare unit to compare an address sent by the CPU and a tag address sent by a tag memory and thus produce a cache hit signal, and a CCU state machine to control the data access direction of the cache data control and produce corresponding operations according to the tag compare result.

8 Claims, 8 Drawing Sheets

413

| Fill Address | Data Word 0 | Data Word 1 | Data Word 2 | Data Word 3 |

FIG. 5

CACHE CONTROLLER UNIT ARCHITECTURE AND APPLIED METHOD

BACKGROUND OF THE INVENTION

1. Field of the Invention

The invention relates to a cache controller unit architecture for high performance microprocessor systems which uses a write-back cache memory. Particularly, an operating method for the cache controller unit (CCU) is provided to improve cache performance during dirty cache line write-back.

2. Description of Related Art

Modern high performance microprocessor systems usually employ a hierarchy of different memories. At the level closest to the central processing unit (CPU) core is cache memory, usually comprising high speed static random access memory (SRAM). The cache memory is usually on-chip with the CPU core so it can operate at the same clock speed as with the CPU. At the lower level, it is main memory which consists of whole physical memory space seen by the CPU. Main memory typically resides off-chip, and is slower but cheaper, e.g. dynamic random access memory (DRAM). The cache memory holds a sub-set of memory locations in the main memory. When the data address accessed by the CPU is in cache (a hit), the access goes to cache directly, so the CPU can process data without stalling. However, when the data address accessed by the CPU is not in cache (a miss), the access must go to the main memory, which usually takes a long time. In this case, the CPU must stall until data is returned from the main memory.

In a microprocessor system, the main memory may be accessed by a number of sources besides the CPU; for example, input-output (IO) devices or direct memory access (DMA) master. The cache memory must maintain cache coherency, and the main memory should contain the same copy of data as the cached. There are two approaches for this. One approach is write-through (WT) cache, where when the CPU writes to the data cache memory when the data is in the cache, it also writes the same data to the main memory, so the main memory always contains the same copy of data as the cache. The WT cache is easier to design and maintains cache coherency better, but always writes to the slower main memory, impacting CPU performance. The other approach is write-back (WB), where the CPU writes data to cache memory only when the data is in the cache, and the modified data is not updated to the main memory until some time later, to maintain cache coherency. One situation in which the modified or "dirty" cache line must be updated to cache is when a read miss resulting in the dirty cache line must be replaced. In this case, the dirty line must be read out from cache and put into the main memory before it is replaced by a new cache line. This incurs two serial operations; writing the dirty cache line from cache to the main memory, and reading the new cache line from the main memory to cache. The CPU must stall for the duration of the serial operation, causing performance reduction.

One common solution to serial transfer issues is to use a write buffer or register between cache and main memory to temporarily store the dirty line. FIG. 1 is a block diagram of a typical microprocessor system with cache memory. FIG. 2 is a flowchart of the operation of FIG. 1. In FIG. 1, the system includes a CPU 11, a tag memory 12, a cache memory 13, a cache control unit (CCU) 14, a main memory 15, a memory controller (MEMC) 16, a bus interface unit (BIU) 17 with a write buffer 171 and a system bus 18. As shown in FIGS. 1 and 2, when CPU 11 wants to access data in main memory, it issues a read/write command and an address to CCU 14 (S1). CCU 14 checks if the address exists in cache memory (S2) by comparing this address with the content of tag memory 12, containing the upper address bits for each cache line in the cache memory, and possibly containing some control bits for each cache line, such as valid bit, indicating the data in the cache line is valid and dirty bit, indicating the data in the cache line has been modified. If the address hits, the data is read from cache memory 13 to the CPU 11 (for read operation) or written to cache memory 13 from CPU 11 (for write operation) (S3). If the address misses, the required data is in main memory 15, and CCU 14 must redirect the access to BIU 17 responsible for accessing a number of devices connected to system bus 18, especially the MEMC 16, used to access main memory. BIU 17 usually contains a write buffer 171 to hold a dirty line written to the main memory 15 to maintain cache coherency. For re-direction, CCU 14 issues a fill request to BIU 17 (S4), to check if the line to be replaced is dirty or clean (S5). If the replace line is dirty, CCU 14 must wait until write buffer is available or empty (S6). Next, CCU 14 puts the dirty line into write buffer 171 (S7) and waits for the first request word available from BIU 17 (S8) to continue CPU 11 operation (S9).

However, this operation may create a worst-case condition as shown in FIG. 3. When data in write buffer 171 is not empty and BIU 17 has not started to update data in write buffer 171 to the main memory, a miss occurs as shown by solid line A of FIG. 3. Since the fill request always has higher priority in BIU 17, BIU 17 will service the fill request first, so CCU 14 must wait at step S6 even though the miss line has been filled (at dotted line B of FIG. 3). In this case, it must wait until the miss line has been filled and write buffer 171 empties (at solid line C of FIG. 3), impacting CPU performance.

SUMMARY OF THE INVENTION

Accordingly, an object of the invention is to provide a cache controller unit architecture for high performance microprocessor systems with write-back cache memory, which can reduce cache controller waiting for available write buffers.

Another object of the invention is to provide an operating method for high performance microprocessor systems with write-back cache memory, which dynamically delays the write operation to the next cache miss if the write buffer is not empty or available, thereby improving cache performance during dirty cache line write-back.

The invention provides a cache controller unit (CCU) architecture including a cache data control unit to access data between a cache memory and a CPU, a tag compare unit to compare an address sent by the CPU and tag address sent by a tag memory and produce a cache hit signal, a CCU state machine to control the data access direction of the cache data control according to the tag compare result, and write a dirty line to the write buffer if the dirty flag is set and the write buffer is empty, issue a fill request to a BIU with a write buffer in order to request the BIU to fetch data of a new cache line if a dirty flag is not set, or set the dirty flag and continue the CPU operation if the write buffer is not empty so that the replace line becomes a new dirty line, and a fill buffer to store information sent by the BIU and provide the information to the CCU state machine for operation, wherein the information includes data and addresses of the dirty line and the new cache line.

An operating method for the cache controller unit (CCU) is further provided, including checking current cache hit or miss status when a read or write command is issued, accessing the data from the cache memory in the event of a cache hit, checking if a dirty flag is active in the event of a cache miss, issuing a fill request to the BIU to request a new line from the main memory when the dirty flag is not active, issuing a fill request to the BIU to request a new line from the main memory and reading a dirty line of the previous miss from the cache memory to the write buffer at the same time, when the write buffer is empty and the dirty flag is active, putting the previous miss data from the fill buffer into the cache memory, updating the fill address field to the current miss line address, checking if the new line to be replaced is dirty, setting the dirty flag as inactive without updating the new line when the new line is not dirty, checking if the write buffer is empty when the new line is dirty, setting the dirty flag as active when the write buffer is not empty in order to put the new line (a new dirty line) into the write buffer later so the CCU and the CPU are released without waiting for the write buffer to empty, setting the dirty flag as inactive after the new line is in the write buffer when the write buffer is empty, and continuing CPU operation according to a first data word of the new line fetched from the fill buffer and passed by the CCU.

BRIEF DESCRIPTION OF THE DRAWINGS

FIG. 5 is a diagram of a content example of a fill buffer of FIG. 4 according to the invention;

DETAILED DESCRIPTION OF THE INVENTION

The following numbers denote the same elements throughout the description and drawings.

A cache memory can be further divided into a number of levels, for example, L1 (level 1) cache is closest to the CPU and fastest, L2 (level 2) is the next level and slower than L1 but larger than L1 . This invention embodies a general principle and can be applied to any cache level memory. However, for ease of description, the following descriptions assume that the cache memory only consists of one cache level.

When a cache miss occurs, a line of data must be read from the main memory and put into cache. A line, usually a multiple of CPU word, is the basic unit of data to read from the main memory when a miss occurs.

There are many ways to place a line fetched from the main memory, such as using either a direct-mapped cache that is a cache organization where a line can be placed only to one specific location in the cache, an n-way set-associative cache that is a cache organization where a line can be placed to one of n locations in the cache, or a fully associative cache that is a cache organization where a line can be placed to any location in the cache. The invention can be applied to all the above.

Figure 1:
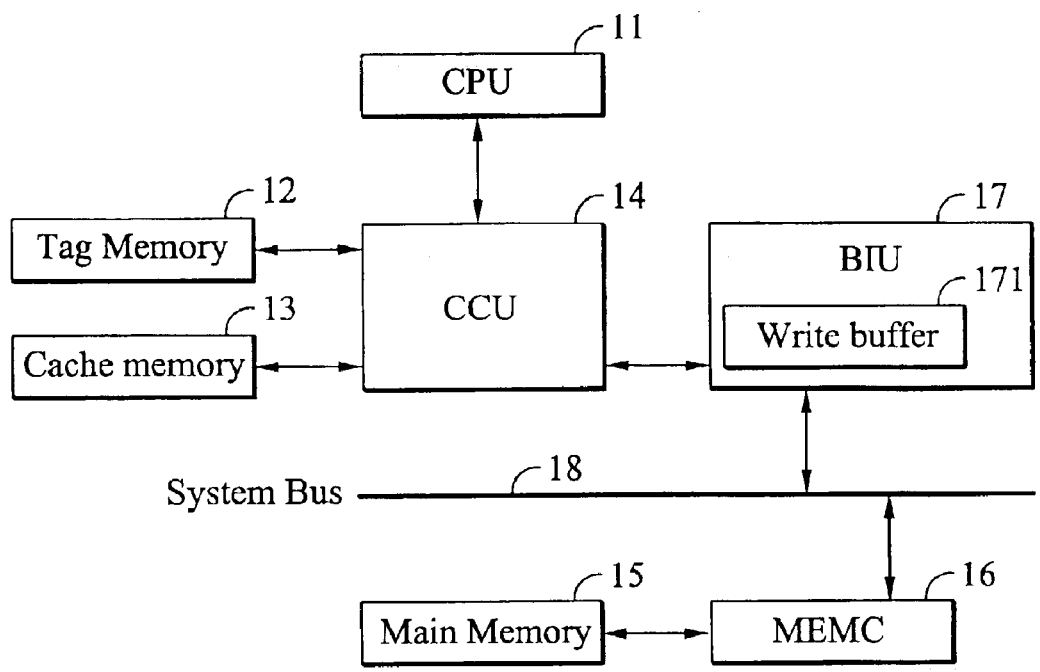
FIG. 1 is a conventional microprocessor system with cache memory.
Figure 2:
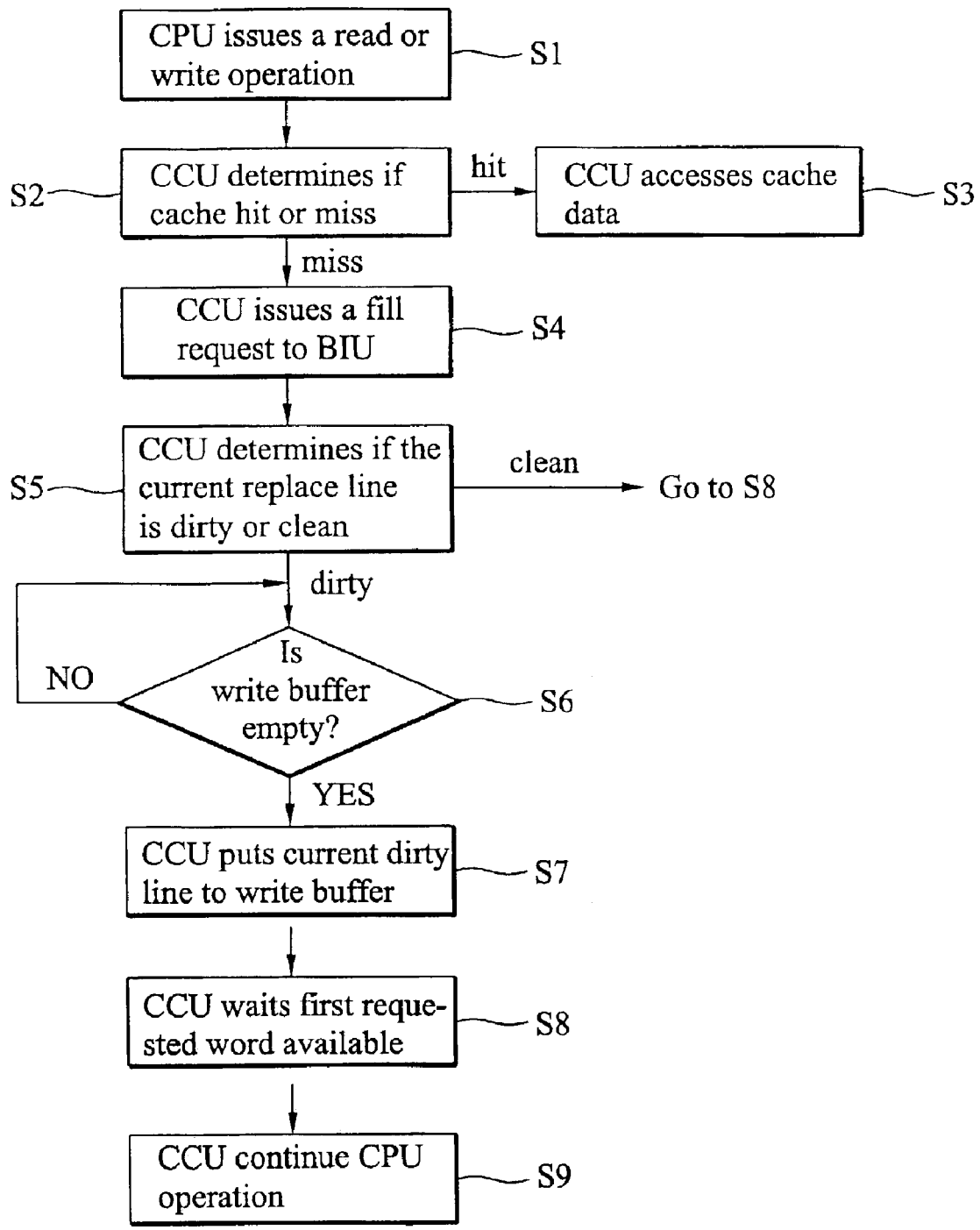
FIG. 2 is a flowchart of FIG. 1.
Figure 3:
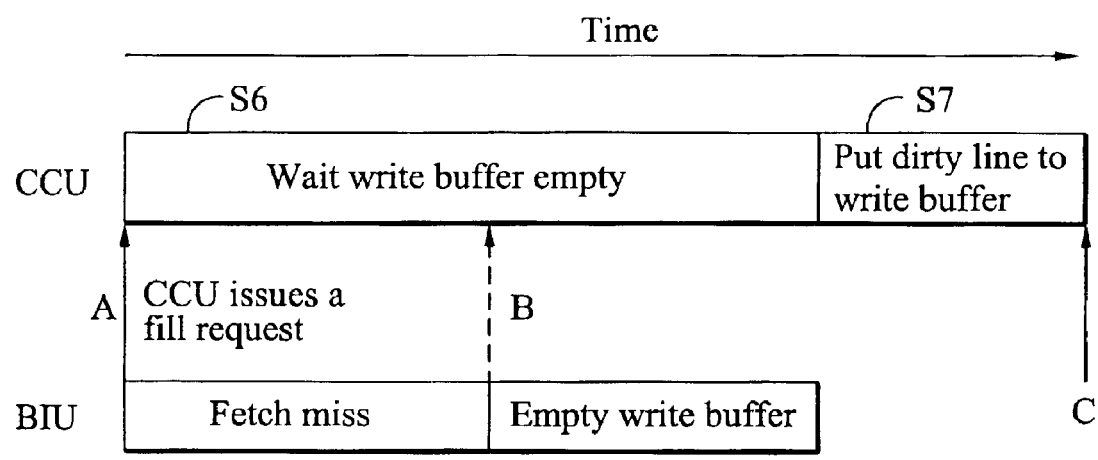
FIG. 3 is a diagram of a sequence of cache controller operations of FIG. 1.
Figure 4:
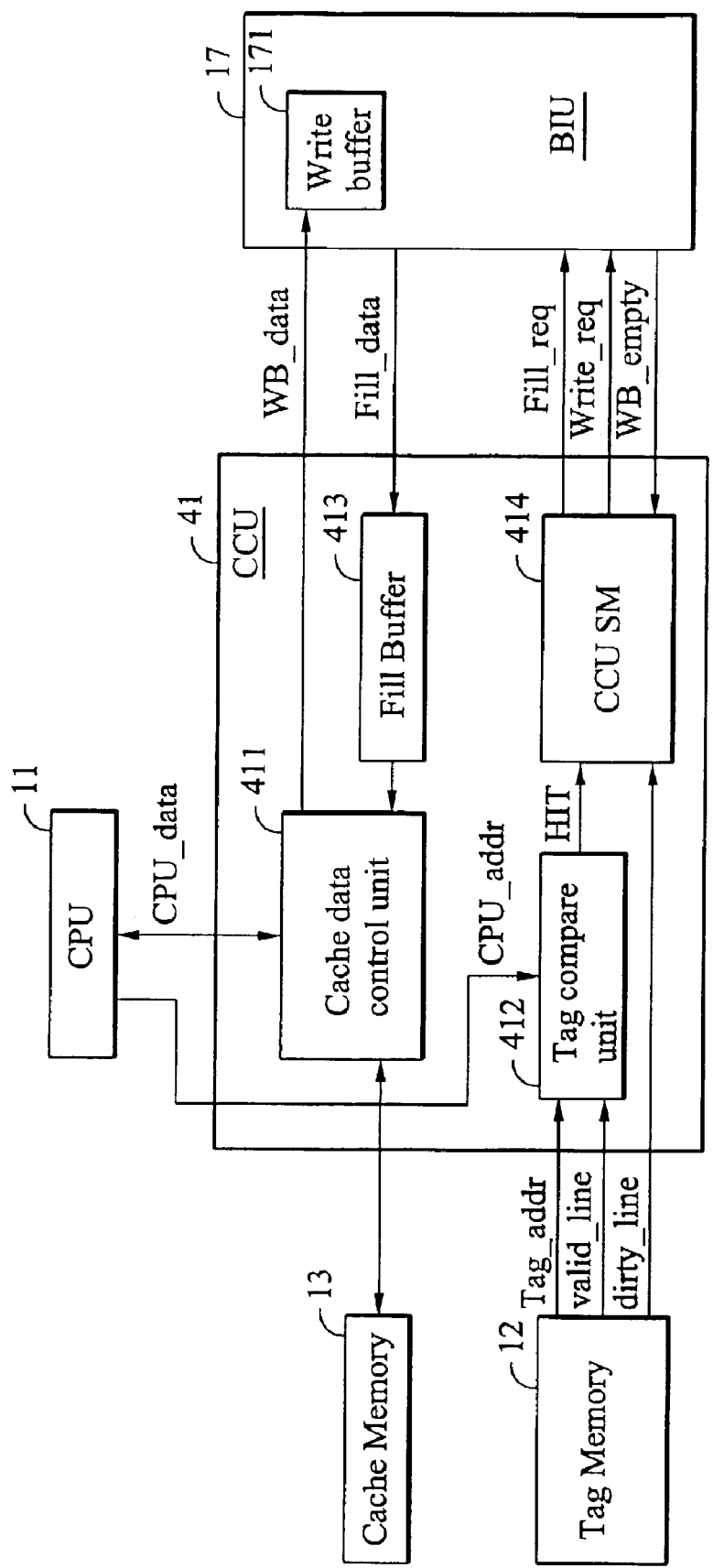
FIG. 4 is a block diagram of a cache controller unit according to the invention.

FIG. 4 shows a block diagram of the cache controller unit (CCU) according to the present invention. In FIG. 4, the unit 41 includes: a cache data control unit 411, a tag compare unit 412, a fill buffer 413 and a CCU state machine 414. As well as the unit 41, this microprocessor system also includes a CPU 11, a cache memory 13, a tag memory 12, a bus interface unit (BIU) 17 with write buffer 171, as shown in FIG. 1.

As shown in FIG. 4, the unit 412 is a combinational logic, which compares the address output (CPU_addr) of the CPU 11 and the tag address output (Tag_addr) of the tag memory. The output (Tag_addr) also contains a valid bit, indicating that the corresponding cache line contains valid data, and a dirty bit, indicating that the corresponding cache line has been modified. If CPU_addr and Tag_addr are equal and the valid bit is true, a signal HIT is active to the state machine 414. The state machine 414, as a control core in the CCU 41, instructs the unit 411 to read data from the cache memory 13 to the CPU 11 (for read operation) or to write data to the cache memory 13 from the CPU 11 (for write operation). If the signal HIT is not active, i.e., conversely, such as a read miss active, the state machine 414 then issues a signal Fill_req to request the BIU 17 to fetch a new cache line. If the replace line is dirty (the dirty bit "1"), the dirty line must be updated to the main memory (FIG. 1) to maintain cache memory coherency. In this case, the state machine 414 also issues a signal Write_req to the BIU 17 to put data WB_data on the dirty line into the write buffer 171 from the cache memory 13 if the write buffer 171 is empty (WB_empty=1). After the BIU 17 fetches data on the new cache line, it puts the data Fill_data into the fill buffer 413. The data in the fill buffer is sent to the CPU 11 to continue CPU operation for next instruction.

FIG. 5 is an example of the fill buffer structure according to the invention. As shown in FIG. 5, the structure contains a fill address field to store the miss line address, and multiple data word fields to store a line of data to be fetched. In this case, a cache line contains 4 CPU words, described as an example only, without signifying a limitation.

Figure 6A:
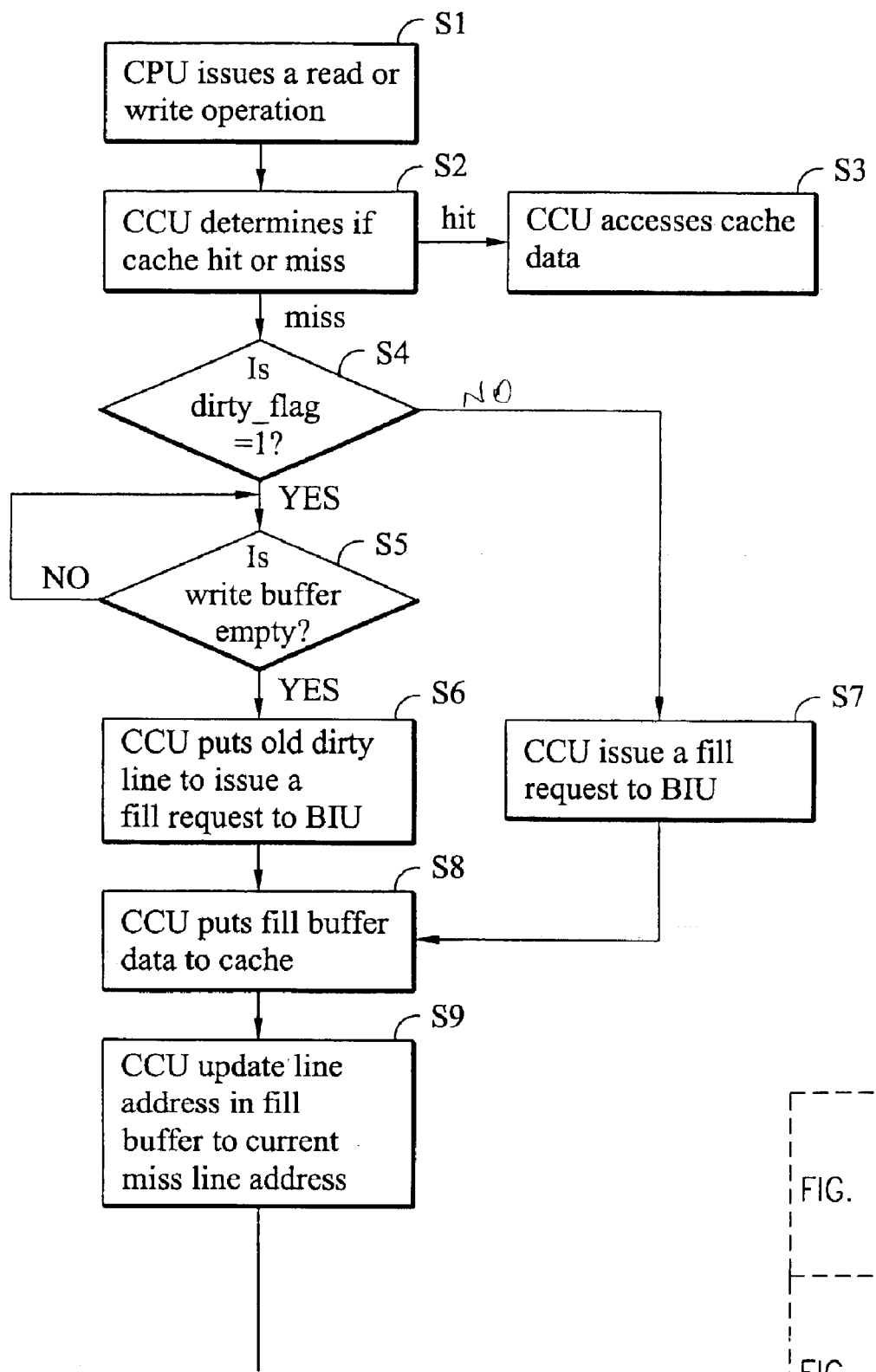
FIGS. 6a and 6b are a complete flowchart of FIG. 4 according to the invention.
Figure 6B:
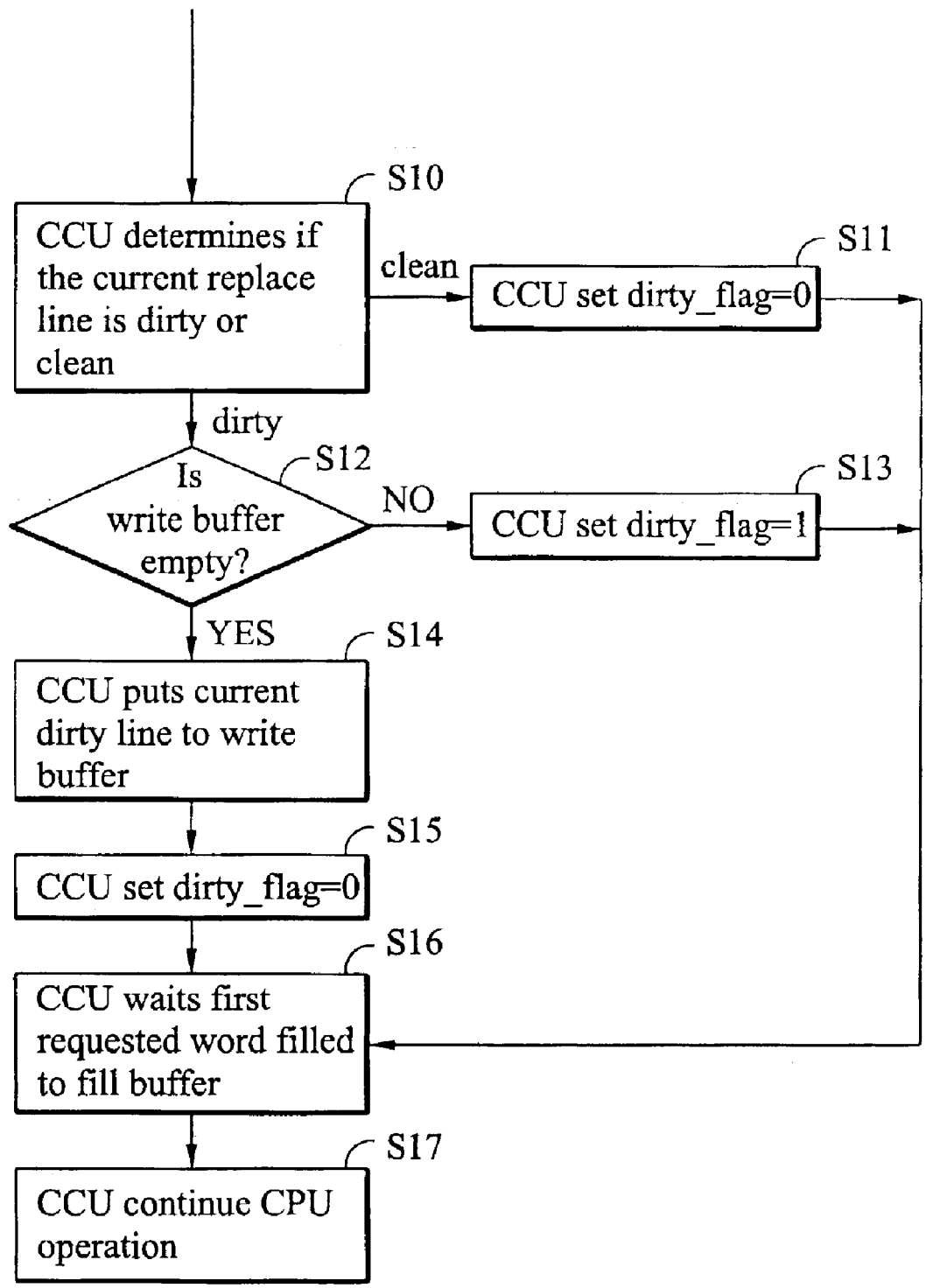
Figure 7:
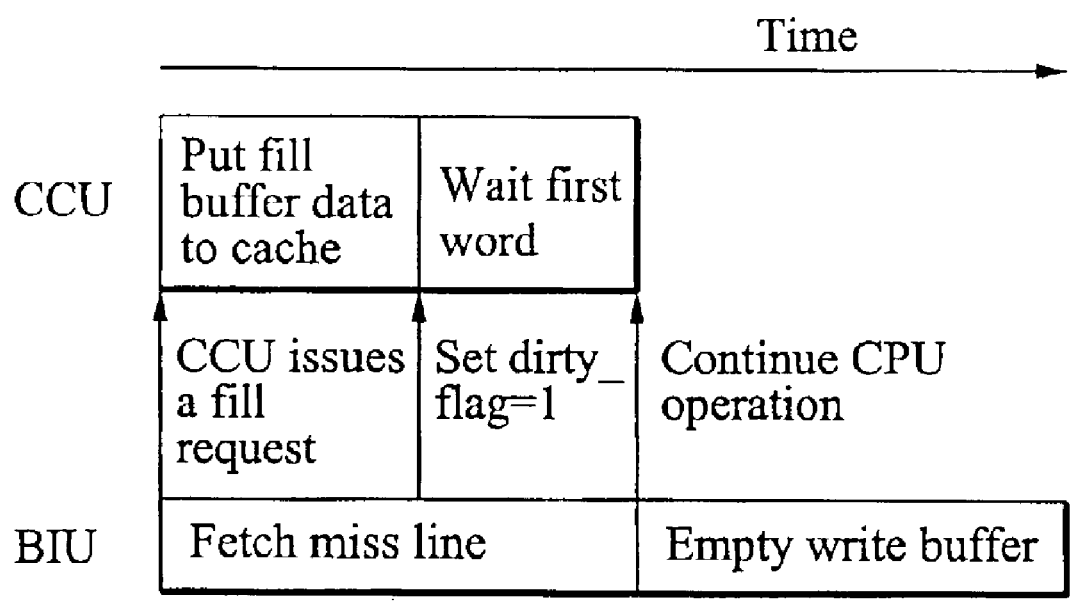
FIG. 7 is a diagram of a sequence of cache control operations of FIG. 4 according to the invention.

FIGS. 6a and 6b are a flowchart of the operation of FIG. 4 according to the invention. As shown in FIGS. 6a and 6b, when the CPU issues a read or write command (S1), the CCU checks current cache hit or miss status (S2). If a cache hit, the CCU accesses the data from the cache memory (S3) and the CPU continues its operation without stalling. If it is a cache miss, the CCU further checks if a bit dirty_flag is active (S4), i.e., dirty_flag=1, wherein the dirty_flag is a status bit used by the CCU to indicate if the dirty line to be replaced due to previous miss has been put into write buffer. If dirty_flag=1, the CCU has to wait until the write buffer is empty (S5). When the write buffer is empty, the CCU issues a fill request to the BIU to request a new line from the main memory, and, at the same time, reads the dirty line from the cache memory to the write buffer (S6). When the dirty flag is not active, a fill request is issued to the BIU to request a new line from the main memory (S7). Note that the dirty line read in S6 is the dirty line of the previous miss, not of the current miss. Data in the fill buffer is put into the cache memory (S8). Note that data in the fill buffer is the data fetched for the previous miss, not for data on the new cache line of the current miss. Due to the relatively slow speed of main memory and system bus, data on the new cache line is still being fetched by the BIU at this time. In steps S6 and S8, the address used to access the cache memory is from the fill address field in the fill buffer containing the address and data of the previous miss. Next, the CCU updates the fill address field to the current miss line address (S9) and checks if the line to be replaced is dirty (S10). If the replace line is not dirty (i.e. clean), no update is active and the dirty_flag is set to 0 (S11). If the replace line is dirty, the CCU further checks if the write buffer is empty (S12). If not, the dirty_flag is set to 1 (S13) and the dirty line is put into the write buffer later. This releases the CCU and the CPU to wait for the write buffer to empty. If the write buffer is empty, the current replace line is put into the write buffer (S14) and the dirty_flag=0 (S15). Next, the CCU waits for a first data word of the miss line to be filled to the fill buffer (S16). After the first data word is received, the word is passed to the CPU so the CPU can continue operation (S17). The remaining words of the miss line can be filled to the fill buffer while the CPU continues the operation later. The aforementioned is clearly shown in FIG. 7, wherein the CPU continues the operation by setting the dirty_flag=1 as the CCU issues a fill request during the fetch miss line cycle. Therefore, the CPU operation does not stall due to the write buffer not being empty. Note that from S6 to S16, the BIU is fetching the miss line from the main memory, and due to the relatively slow speed of main memory and system bus, the bottleneck is usually at the BIU fetching the miss line instead of CCU perfoming tasks from S6 to S16. Note that S6 and S14 will not both be performed on an iteration of FIG. 5. If S4 is performed, write buffer will not be empty, so when the CCU state machine goes to S12, it will go to S13 instead of S14. From S13, CCU then goes to S16, without waiting for the write buffer empty to put the dirty line into the write buffer. This action is delayed until the next cache miss, when CCU goes to S4 on the next miss. In this case, a dirty_flag is active due to S13 of the previous miss. CCU may still have to wait for write buffer to empty on S5. However, this possibility is very small when compared with the prior art since the time between the previous and current misses can be used by BIU to empty the write buffer. There are two points at which to put the dirty line into write buffer, in S6 and in S14. The invention dynamically selects at which points to put dirty line into write buffer depending if the write buffer is empty when a miss occurs, thus achieving optimum CPU performance.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A cache controller unit (CCU) architecture with dirty line write-back auto-adjustment, suitable for high performance microprocessor systems having a write-back cache memory, a tag memory, a central processing unit (CPU), and a bus interface unit (BIU) with a write buffer, the architecture comprising:

a cache data control unit to access data between the cache memory and the CPU;

a tag compare unit to compare an address output sent by the CPU and a tag address output sent by the tag memory and thus produce a cache hit signal;

a CCU state machine to control the access direction of the cache data control unit according to the tag compare result, write a dirty line to the write buffer if a dirty flag is set and the write buffer is empty, issue a fill request to the BIU in order to request the BIU to fetch data of a new cache line if the dirty flag is not set, or set the dirty flag and continue the CPU operation if the write buffer is not empty so that the replace line becomes a new dirty line; and a fill buffer to store information sent by the BIU and provide the information to the CCU state machine for operation, wherein the information includes data and addresses of a miss line.

2. The cache controller architecture of claim 1, wherein the fill buffer comprises a line address field to store a miss line address; and multiple data fields to store the corresponding data of the miss line to be fetched by the CPU.

3. The cache controller architecture of claim 1, wherein the tag address output further comprises a valid bit, indicating that a corresponding cache line contains valid data; and a dirty bit, indicating the corresponding cache line has been modified.

4. The cache controller architecture of claim 3, wherein the corresponding cache line is the dirty line or the new cache line.

5. An operating method of a cache controller unit (CCU) architecture with dirty line write-back auto-adjustment, suitable for high performance microprocessor systems having a write-back cache memory, a main memory, a tag memory, a central processing unit (CPU), and a bus interface unit (BIU) with a write buffer, the method comprising the steps of:

checking current cache hit or miss status when a read or write command is issued;

accessing the data from the cache memory in the event of a cache hit;

checking if a dirty flag is active in the event of a cache miss;

issuing a fill request to the BIU to request a new line from the main memory when the dirty flag is not active;

issuing a fill request to the BIU to request a new line from the main memory and reading a dirty line of the previous miss from the cache memory to the write buffer at the same time, when the write buffer is empty and the dirty flag is active;

putting the previous miss data from a fill buffer into the cache memory;

updating the fill address field to the current miss line address;

checking if the new line to be replaced is dirty;

setting the dirty flag as inactive without updating the new line when the new line is not dirty;

checking if the write buffer is empty when the new line is dirty;

setting the dirty flag as active when the write buffer is not empty in order to put the new line into the write buffer later, such that the CCU and the CPU is released without waiting for the write buffer to empty;

setting the dirty flag as inactive after the new line is in the write buffer when the write buffer is empty;

continuing the CPU operation according to a first data word of the new line fetched from the fill buffer and passed by the CCU.

6. The operating method of claim 5, wherein the dirty flag is a status bit used by the CCU to indicate if the dirty line to be replaced due to previous miss has been put into the write buffer.

7. The decoding method of claim 5, wherein the fill buffer respectively stores the address and data of the previous miss, current miss, and CPU operations at different steps.

8. The decoding method of claim 5, wherein the CCU uses the fill buffer with a fill address field to store the miss line address and multiple data word fields to store a line of data to be fetched by the CPU.

* * * * *